(12) United States Patent
Takeda (10) Patent No.: US 8,429,172 B2
(45) Date of Patent: Apr. 23, 2013

(54) MOBILE COMMUNICATION TERMINAL AND METHOD FOR RECOMMENDING CONTENT ITEM

(75) Inventor: Kentaro Takeda, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 241 days.

(21) Appl. No.: 12/722,678

(22) Filed: Mar. 12, 2010

(65) Prior Publication Data

US 2011/0010673 A1 Jan. 13, 2011

(30) Foreign Application Priority Data

Jul. 7, 2009 (JP) ................ P2009-160976

(51) Int. Cl.
*G06F 17/30* (2006.01)
*H04N 7/173* (2011.01)

(52) U.S. Cl.
USPC ............................................ 707/748; 725/46

(58) Field of Classification Search .......... None
See application file for complete search history.

(56) References Cited

U.S. PATENT DOCUMENTS

| | | | | |
|---|---|---|---|---|
| 7,137,136 B1 * | 11/2006 | Aratani | ........................... | 725/53 |
| 2003/0225777 A1 * | 12/2003 | Marsh | ........................... | 707/101 |
| 2004/0176958 A1 * | 9/2004 | Salmenkaita et al. | ........ | 704/275 |
| 2005/0259473 A1 * | 11/2005 | Takemoto et al. | ....... | 365/185.22 |
| 2006/0117094 A1 * | 6/2006 | Li | ................................... | 709/219 |
| 2008/0249968 A1 * | 10/2008 | Flinn et al. | ....................... | 706/14 |
| 2008/0295005 A1 * | 11/2008 | Salesin et al. | ................. | 715/763 |
| 2010/0026526 A1 * | 2/2010 | Yokota | ......................... | 340/996 |
| 2010/0205541 A1 * | 8/2010 | Rapaport et al. | .............. | 715/753 |
| 2010/0281506 A1 * | 11/2010 | Schmidt et al. | ................ | 725/46 |

OTHER PUBLICATIONS

Kato et al., "Programming by example System Using Fuzzy Context for Mobile Device", 7th Programming and Application Systems Workshop SPA 2004, pp. 177-184 (2004).

* cited by examiner

*Primary Examiner* — Tarek Chbouki
(74) *Attorney, Agent, or Firm* — Maschoff Brennan (57) ABSTRACT

According to one embodiment, a mobile communication terminal comprises a storage device which stores rule information including at least one pair of condition information and content information, wherein the condition information is composed of a plurality of condition labels, a condition estimator which generates condition estimation data indicating accuracy data regarding a condition of the terminal for each of a plurality of condition labels based on sensed data, wherein the each condition label is fallen into one of a plurality of condition items, a priority decision section which estimates the rule information and determines priority data for the pair, an estimator which generates an estimation value indicating a summation the accuracy data from the condition estimator and the priority data, and a selection section which provides a shortcut button to run a program with a display device based.

16 Claims, 5 Drawing Sheets

| CONDITION ITEM (C1) | CONDITION LABEL (C2) | ACCURACY LABEL (C3) |
|---|---|---|
| TIME RANGE (C11) | MORNING | 0.8 |
| | DAYTIME | 0.2 |
| | NIGHT | 0.0 |
| | LATE NIGHT | 0.0 |
| MOVING CONDITION (C12) | STANDSTILL | 0.1 |
| | WALK | 0.5 |
| | RUN | 0.4 |
| | VEHICLE | 0.0 |
| PLACE (C13) | HOME | 0.1 |
| | OFFICE | 0.0 |
| | OTHERS | 0.9 |
| DESTINATION (C14) | HOME | 0.0 |
| | OFFICE | 0.8 |
| | OTHERS | 0.2 |

Fig. 3

| ID (R1) | CONDITION (R2) | | | | CONTENT ITEM (R3) | BASIC PRIORITY (R4) |
|---|---|---|---|---|---|---|
| | TIME RANGE (R21) | MOVING CONDITION (R22) | PLACE (R23) | DESTINATION (R24) | | |
| 1 | MORNING | STANDSTILL OR WALK | * | * | START BUTTON OF PHONE CALL | 1.0 |
| 2 | MORNING OR NIGHT | STANDSTILL OR WALK | * | * | START BUTTON OF EMAIL APPLICATION | 1.0 |
| 3 | * | VEHICLE | * | * | SWITCHING BUTTON TO MANNER MODE | 1.0 |
| 4 | DAYTIME | * | OFFICE | * | SHOW NEWS PROGRAM | 1.0 |

MOBILE COMMUNICATION TERMINAL AND METHOD FOR RECOMMENDING CONTENT ITEM

CROSS REFERENCE TO RELATED APPLICATIONS

This application is based upon and claims the benefit of priority from the prior Japanese Patent Application No. 2009-160976 filed on Jul. 7, 2009; the entire contents of which are incorporated herein by reference.

BACKGROUND

1. FIELD

The disclosure relates to a mobile communication terminal and a method for recommending a content item.

2. DESCRIPTION OF THE RELATED ART

It is ordinary known that a mobile communication terminal stores a rule to run a program. If a condition of the mobile communication terminal accords with the rule, the program corresponding to the condition automatically runs.

According to a literature, Fumihiko Kato, Norio Toyama, Takashi Hattori & Tatsuya Ogino, working papers for "7th Programming and Application Systems Workshop SPA 2004", pp. 177-184 (2004), the rule is composed of at least one condition, such as items of a date, a time and a place, and action information. In addition, each condition is defined by at least one condition label. For example, the condition is composed of condition labels of "morning", "evening" and so on for the time item, and "Pennsylvania Station", "office" and so on for the place item.

The rule is composed of the condition labels and the action information. For example, the rule is defined by "daytime" and "office" as the condition labels, and "display a news program" as the action information.

Further, the mobile communication terminal determines whether a condition of the mobile communication terminal accords with each of the condition labels by using sensor data obtained from a sensor. For example, a degree of accord is estimated based on an estimation equation, in such a way that it is estimated that the condition of the mobile communication terminal accords with the condition label in the rule if an output of the estimation equation exceeds a threshold.

Then, the condition of the mobile communication terminal satisfies a combination of the condition labels in the rule, a program identified in the rule is automatically run.

That is, the mobile communication terminal described above has a condition estimation means for calculating accuracy information which indicates the degree of accord with each of condition labels on the basis of a sensor output, and a recommend rule which sets a combination of the condition labels as a condition and describes a combination of the condition and a content item to be provided. If a combination of condition labels whose accuracy information are greater than a threshold accords with the condition described in the recommend rule, the mobile communication terminal automatically recommends a content item which corresponds to the recommend rule.

Incidentally, if a plurality of recommend rules are provided, the above technology has a problem in some cases in that an obtained condition agrees with the plural recommend rules at the same time, and the number of provided content items is greater than the maximum number of recommended content items. As a result, the technology also has a problem in that a content item corresponding to a recommend rule that firmly accords with the condition is covered with a content item that corresponds to a recommend rule of a weaker degree of accord.

According to a technology for estimating a condition in which a mobile communication terminal is being put and for recommending, upon the condition according with a specific condition, a content item corresponding to the condition, a result of estimating the condition is treated as an indefinite "accuracy" and a degree to which the accuracy meets the condition is computed and used so that a proper recommendation is somewhat enabled even if the condition is being uncertain.

In a case, however, where a condition is treated as the accuracy and a plurality of conditions are specified and specifically described, there is a problem in that a content item is hardly recommended as it is less certain to meet all the conditions.

Further, if a plurality of recommend rules are provided, there is a problem in some cases in that an obtained condition accords with the plural recommend rules at the same time, and the number of provided content items is greater than the maximum number of recommended content pieces. As a result, a content item corresponding to a recommend rule that much accords with the condition is covered with content items that correspond to recommend rules of a weaker degree of agreement.

SUMMARY

Exemplary embodiments of this invention provides a mobile communication terminal that comprises a storage device which stores rule information including at least one pair of condition information and content information for selecting a program to be recommended, wherein the condition information is composed of a plurality of condition labels, a condition estimator which generates condition estimation data indicating accuracy data regarding a condition of the mobile communication terminal for each of a plurality of condition labels based on sensed data, wherein the each condition label is fallen into one of a plurality of condition items, a priority decision section which estimates the rule information and determines priority data for the pair, an estimator which generates an estimation value indicating a summation the accuracy data from the condition estimator and the priority data from the priority decision section, and a selection section which provides a shortcut button to run the program with a display device based on the estimation value and the rule information.

DETAILED DESCRIPTION

Exemplary embodiments of the invention are described with reference to the drawings.

Figure 1:
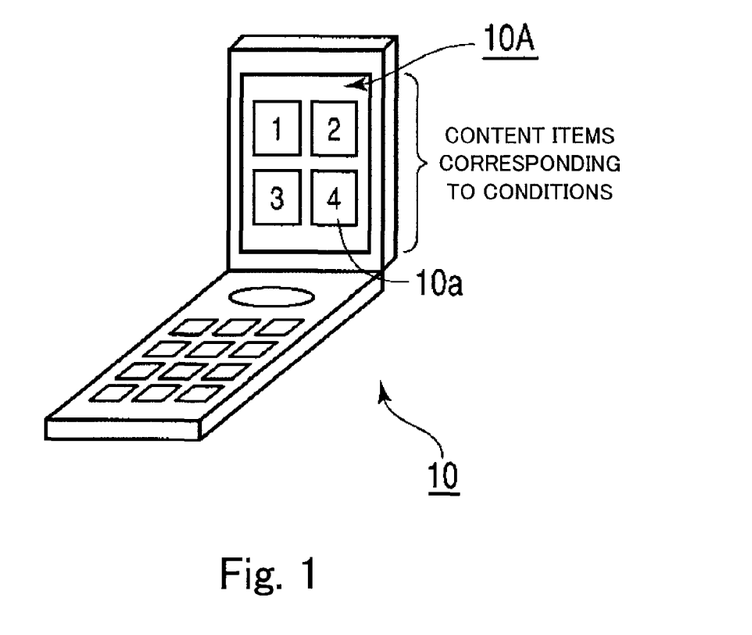
FIG. 1 shows an exemplary external view of a mobile communication terminal.
Figure 2:
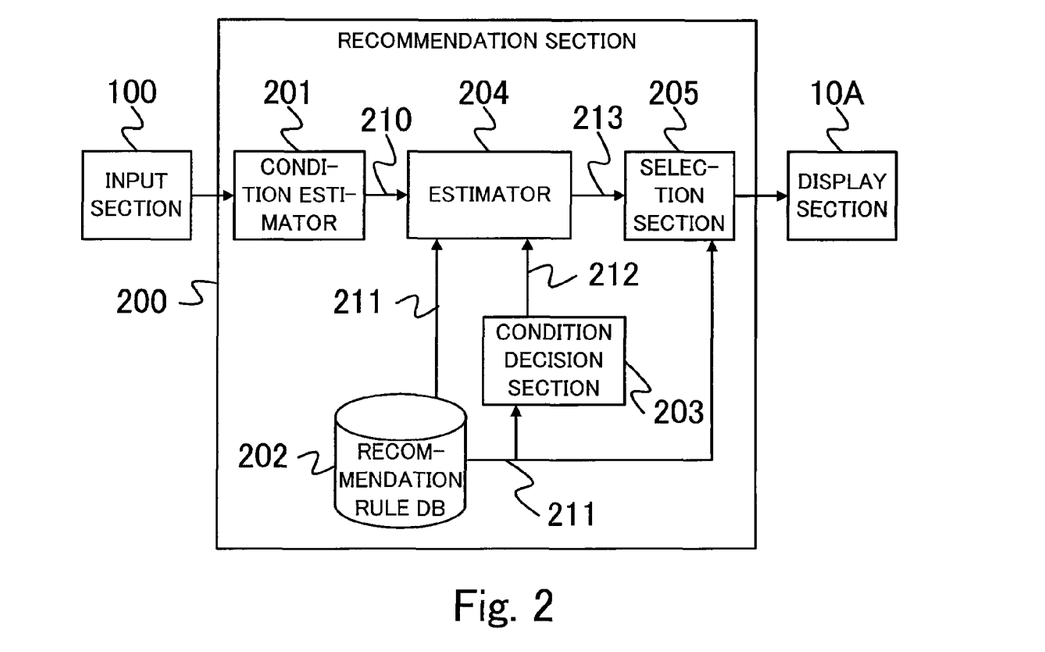
FIG. 2 shows an example of a schematic configuration of the mobile communication terminal.

FIG. 1 shows an example of an external view of a mobile communication terminal 10. FIG. 2 shows an example of a system configuration of the mobile communication terminal 10. For convenience of explanation, only portions directly related to a characteristic of the mobile communication terminal 10 of the embodiment are shown in FIGS. 1 and 2.

The mobile communication terminal 10 has an input section 100, a recommendation section 200 and a display section 10A.

The input section 100 receives data from data input devices such as several kinds of sensors, which measure a physical quantity directly or through communication, connected to or integrated in the mobile communication terminal 10. The data input devices are, e.g., an accelerometer, a GPS device, and a clock device. The mobile communication terminal 10 has these data input devices as means for sensing a condition of the mobile communication terminal 10.

The mobile communication terminal 10 estimates the condition of the mobile communication terminal 10 on the basis of data obtained by the data input devices, chooses a proper content item in accordance with an estimated condition, and indicates the content item on the display section 10A as, e.g., a short cut button for each of functions of the mobile communication terminal 10, which will be described in detail later. The mobile communication terminal 10 thereby presents a content item suitable for the condition of the mobile communication terminal 10.

Incidentally, the display section 10A is, e.g., an LCD display device.

The recommendation section 200 has a condition estimator 201, a recommendation rule DB 202, a condition decision section 203, an estimator 204 and a selection section 205. The condition estimator 201, the condition decision section 203, the estimator 204, and selection section 205 may be realized by a CPU (Central Processing Unit) executing respective programs.

The condition estimator 201 estimates a condition of the mobile communication terminal 10 on the basis of data received by the input section 100, generates condition estimation data 210 and provides the estimator 204 with the condition estimation data 210.

The recommendation rule DB 202 is a database on which recommendation rules 211 are stored.

The condition decision section 203 estimates the recommendation rules 211 stored on the recommendation rule DB 202, and provides the estimator 204 with priority data 212 of the respective recommendation rules 211.

The estimator 204 calculates estimation values 213 of the recommendation rules 211 on the basis of the condition estimation data 210, the recommendation rules 211 and the priority data 212, and provides the selection section 205 with the estimation values 213.

The selection section 205 selects a content item to be output and displays a shortcut button 10a corresponding to the selected content item on the display section 10A. Of course, if the selection section 205 determines that there is no content item to be output, no shortcut button 10a is displayed on the display section 10A. Also, if the selection section 205 determines that there are plural content items to be output, shortcut buttons 10a are displayed on the display section 10A.

A process performed by the recommendation section 200 will be explained below in detail.

Figure 3:
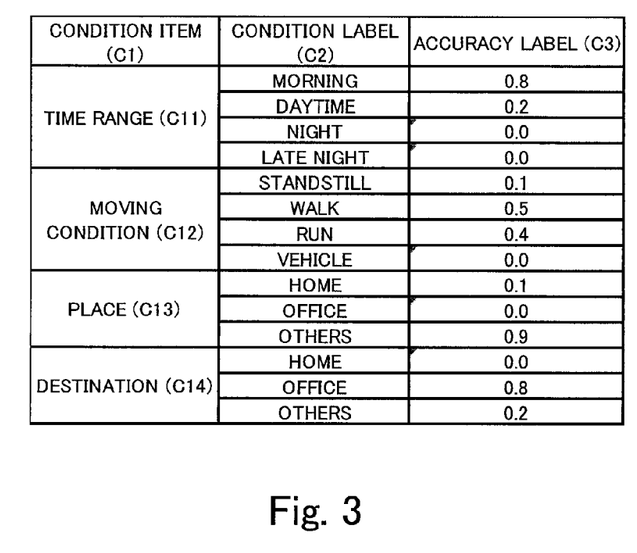
FIG. 3 shows an example of a condition estimation data.

FIG. 3 shows an example of the condition estimation data 210 provided by the condition estimator 201.

The condition estimation data 210 generated by the condition estimator 201 includes a "condition label (C2)" indicating a condition and an "accuracy label (C3) indicating a degree of accordance between the condition indicated by the condition label and the condition of the mobile communication terminal 10. Each condition label (C2) is fallen into one of "condition items (C1)".

The condition items (C1) may be a time range (C11), a moving condition (C12), a place (C13) and a destination (C14).

The condition labels (C2) in the time range (C11) are labels of, e.g., morning, daytime, evening and late night. The condition estimator 201 calculates a time accuracy which shows to what degree a condition indicated by each of the individual condition labels of the time range (C11) accords with present time received by the input section 100. The present time is measured by the clock device.

The condition labels (C2) in the moving condition (C12) are labels of, e.g., a standstill, a walk, a run and a vehicle. The condition estimator 201 calculates a movement accuracy which shows to what degree a condition indicated by each of the individual condition labels of the moving condition (C12) accords with a present condition determined by the input section 100. The present condition is determined based on acceleration data and position data measured by the accelerometer and the GPS device respectively.

The condition labels (C2) in the place (C13) are labels of, e.g., a home, an office and others. The condition estimator 201 calculates place accuracy which shows to what degree a condition indicated by each of the individual condition labels of the place (C13) accords with a present location data received by the input section 100. The present location data is measured by the GPS device.

The condition labels (C2) in the destination (C14) are labels of, e.g., a home, an office and others. The condition estimator 201 calculates destination accuracy which shows to what degree a condition indicated by each of the individual condition labels of the destination (C14) accords with a present place obtained by the input section 100. The present place is obtained based on position data measured by the GPS device.

Figure 4:
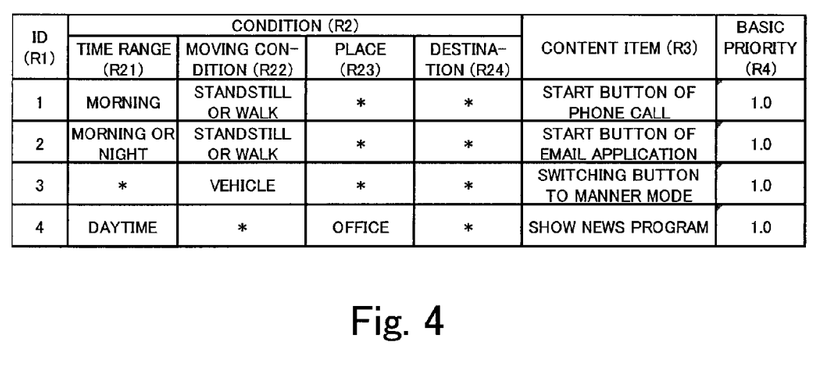
FIG. 4 shows an example of recommendation rules.

FIG. 4 shows a table of examples of the recommendation rules 211. In FIG. 4, respective rows of the table show the examples of the recommendation rules 211.

As shown in FIG. 4, one of the recommendation rules 211 is composed of an ID (R1), a condition (R2), a content item (R3) and a basic priority (R4).

The ID (R1) is an identifier which uniquely identifies one the recommendation rules 211.

The condition (R2) shows conditions each corresponding to one of content items to be recommended in the content item R(3).

The content item R(3) shows a content item to be recommended, and its shortcut button 10a is displayed on the display section 10A if the condition (R2) is satisfied.

The basic priority (R4) indicates a value for determining a priority order in which the individual content items are recommended in a case where a plurality of the recommendation rules 211 satisfy the conditions at the same time. The value of the basic priority (R4) may be set to dynamically change, e.g., on the basis of a user's frequency of use.

The condition (R2) is defined as a combination of the condition labels (C2) in the condition estimation data 210. It is supposed that, if the condition labels (C2) classified as the same condition item (C1) are combined, the condition labels have a relationship of "OR" among one another.

For instance, the recommendation rule 211 shown in FIG. 4 for which the ID (R1) is "1" is an example of a recommendation rule that is set for a supposed operation, i.e., "put a start button of a phone call application on the display section upon standing still or walking in the morning".

Thus, the conditions (R21), (R22), (R23) and (R24) corresponding to the "time range (C11)", "moving condition (R22), "place (C13)" and "destination (C14)" of the state items (C1) are set to "morning", "standstill or walk", "wild card (any condition item will do)" and "wild card", respectively, as the condition (R2).

Similarly, the recommendation rule 211 shown in FIG. 4 for which the ID (R1) is "2" is an example of a recommendation rule that is set for a supposed operation, i.e., "put a start button of an email application on the display section upon standing still or being on a vehicle in the morning or in the evening".

Thus, the conditions (R21), (R22), (R23) and (R24) corresponding to the "time range (C11)", "moving condition (R22), "place (C13)" and "destination (C14)" of the state items (C1) are set to "morning or evening", "standstill or walk", "wild card (any condition item will do)" and "wild card", respectively, as the condition (R2).

Further, the recommendation rule 211 shown in FIG. 4 for which the ID (R1) is "3" is an example of a recommendation rule that is set for a supposed operation, i.e., "put a switching button to a manner mode on the display section upon being on a vehicle".

Thus, the conditions (R21), (R22), (R23) and (R24) corresponding to the "time range (C11)", "moving condition (R22), "place (C13)" and "destination (C14)" of the condition items (C1) are set to "wild card", "vehicle", "wild card" and "wild card", respectively, as the condition (R2).

Then, the recommendation rule 211 shown in FIG. 4 for which the ID (R1) is "4" is an example of a recommendation rule that is set for a supposed operation, i.e., "show a news program upon being in the office".

Thus, the conditions (R21), (R22), (R23) and (R24) corresponding to the "time range (C11)", "moving condition (R22), "place (C13)" and "destination (C14)" of the condition items (C1) are set to "day-time", "wild card", "office" and "wild card", respectively, as the condition (R2).

Incidentally, the recommendation rule 211 may be set in a development phase of the mobile communication terminal or by a user's operation.

Incidentally, the condition estimator 203 estimates the recommendation rule 211 read out from the recommendation rule DB 202 with respect to the number of included wild cards from a viewpoint of whether the specific conditions are defined in the recommendation rule 211, so as to determine a priority of each of the recommendation rules 211. A process for determining the priority of the recommendation rule 211 by means of the condition estimator 203 will be explained with reference to a flowchart shown in FIG. 5.

Figure 5:
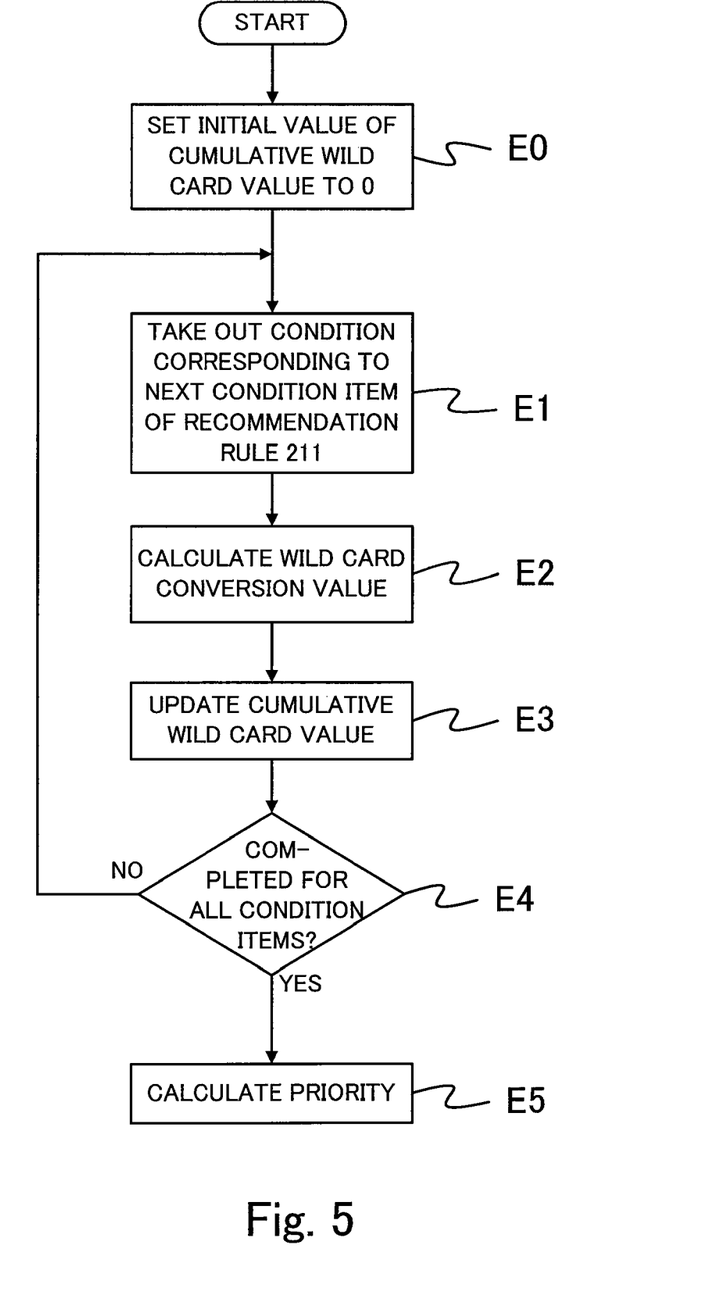
FIG. 5 shows an example of flowchart of a process for calculating priority data.

To begin with, the condition estimator 203 sets an initial value of a cumulative wild card value of the recommend rule 211 to be processed to zero (step E0). The method on how to calculate the cumulative wild card value will be explained later.

Then, the condition estimator 203 reads the conditions (R21, R22, R23 and R24) corresponding to the condition item (C1) from the recommendation rule 211 to be processed in order (step E1).

Then, the condition decision section 203 calculates a wild card conversion value of the condition corresponding to the condition item that has been read at step E1 as follows (step E2).

The wild card conversion value is made 0 and 1 if the condition corresponding to the condition item (C1) is unique and a wild card, respectively. That is, the wild card conversion value is defined as (the number of ORs of the condition)/((the number of state labels)−1) on the basis of the number of ORs included in the condition.

For instance, a case where the condition item (C1) as to the time range (R21) in the conditions (R2) is a wild card is equivalent to a case where the time range (C11) of the state item (C11) is "morning OR daytime OR evening OR late night".

Thus, if the condition of the time range (C11) of the condition item (C1) is a wild card, the wild card conversion value is 3/(4−1)=1.

Similarly, if the time range (C11) of the condition item (C1) is "morning OR evening", the number of ORs is 1 and thus the wild card conversion value is 1/(4−1)=1/3.

After calculating the wild card conversion value as described above, the condition decision section 203 adds the calculated wild card conversion value to the cumulative wild card value and updates the cumulative wild card value (step E3). The condition decision section 203 does the above work for all the condition items, and calculates a cumulative wild card value of all the condition items (C1).

That is, after finishing the above process (step E3), the condition decision section 203 determines whether the cumulative wild card value of all the condition items has been calculated (step E4). Upon branching off from the step E4 to "NO", return to the above (step E1).

Meanwhile, upon branching off from the above (step E4) to "YES", the condition decision section 203 calculates a priority on the basis of the basic priority included in the recommendation rule 211 and the cumulative wild card value as the cumulative wild card value of all the condition items has been calculated (step E5).

Concretely, use a discount function f(x) that works in such a way that the output decreases as the input increases at the step E5, and calculate the priority as (priority)=(basic priority)×f((cumulative wild card value)).

For instance, a function $f(x)=(1-a)\hat{}x$ can be an example of the discount function, where a is a constant, 0<a<1 and "^" indicates a power.

Incidentally, the cumulative wild card value of the recommendation rule 211 of ID(R1)=1 shown in FIG. 4 is 7/3, and the cumulative wild card value of the recommendation rule 211 of ID(R1)=2 shown in FIG. 4 is 8/3

In this case, the output of the discount function is greater for the recommendation rule 211 of ID(R1)=1 than for the recommendation rule 211 of ID(R1)=2. As described above, the recommendation rule 211 of ID(R1)=1 has a higher priority than the recommendation rule 211 of ID(R1)=2 even if both the recommendation rules 211 have the same basic priority.

Concretely, a difference between the recommendation rule 211 of ID(R1)=1 and the recommendation rule 211 of ID(R1)=2 is a difference in the time range (R21) and between "morning" and "morning OR evening". In this case, the former more narrows the condition down and is more specific than the latter. Then, the condition decision section 203 provides the recommendation rule 211 having a more specific condition with the higher priority.

A process due to the estimator 204 will be explained below.

Figure 6:
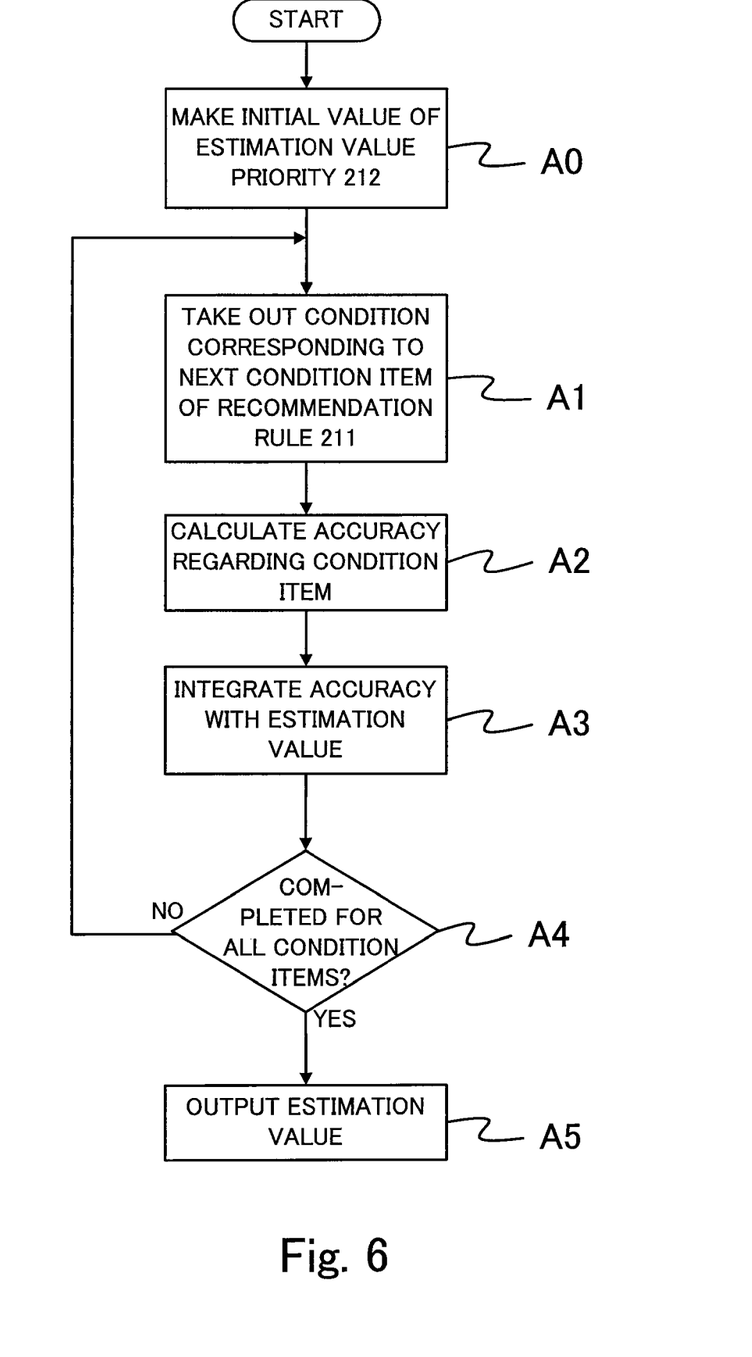
FIG. 6 shows an example of flowchart of a process for calculating an estimation value.

The estimator 204 calculates the estimation value 213 of the recommendation rule 211 on the basis of the condition estimation data 210, the recommendation rule 211 and the priority data 212. A process for calculation the estimation value 213 by means of the estimator 204 will be explained below with reference to a flowchart shown in FIG. 6. FIG. 6 shows a flowchart of the process for calculating the estimation value 213 by means of the estimator 204.

To begin with, the estimator 204 sets an initial value of the estimation value to the priority (step A0). Then, the estimator 204 reads (R21, R22, R23 and R24) from the condition (R2) of the recommendation rule 211 corresponding to the condition item (C1) of the condition estimation data 210 in order (step A1).

Then, the estimator 204 calculates the "accuracy" regarding the condition item (C1) that has been read at step A1 (step A2).

Concretely, at step A2, the estimator 204 takes the condition label (C2) out from the condition corresponding to the condition item (C1) that has been read, and sums up the accuracy (C3) of the condition estimation data 210 having the same condition label (C2).

If the condition is a wild card, the estimator 204 sets 1 to the accuracy at step A2.

Concretely, at step A2, the recommendation rule 211 of ID (R1)=1 in the recommend rules 211 shown in FIG. 4 has the condition of "standstill OR walk" as to the moving state (R22). Thus, if the value of the condition estimation data 210 shown in FIG. 3 is applied, the accuracy concerning the moving state (R22) is 0.1 (standstill)+0.5 (walk)=0.6.

After calculating the accuracy at step A2, the estimator 204 integrates the accuracy with the estimation value (step A3). Then, the estimator 204 determines whether the process (step A1)–(step A3) has been performed for all the condition items (C1) (step A4). Upon branching off from step A4 to "NO", return to step A1.

Meanwhile, upon branching off from step A4 to "YES", the estimator 204 provides the selection section 205 with the value calculated at step A3 as the estimation value 213 (step A5).

Figure 7:
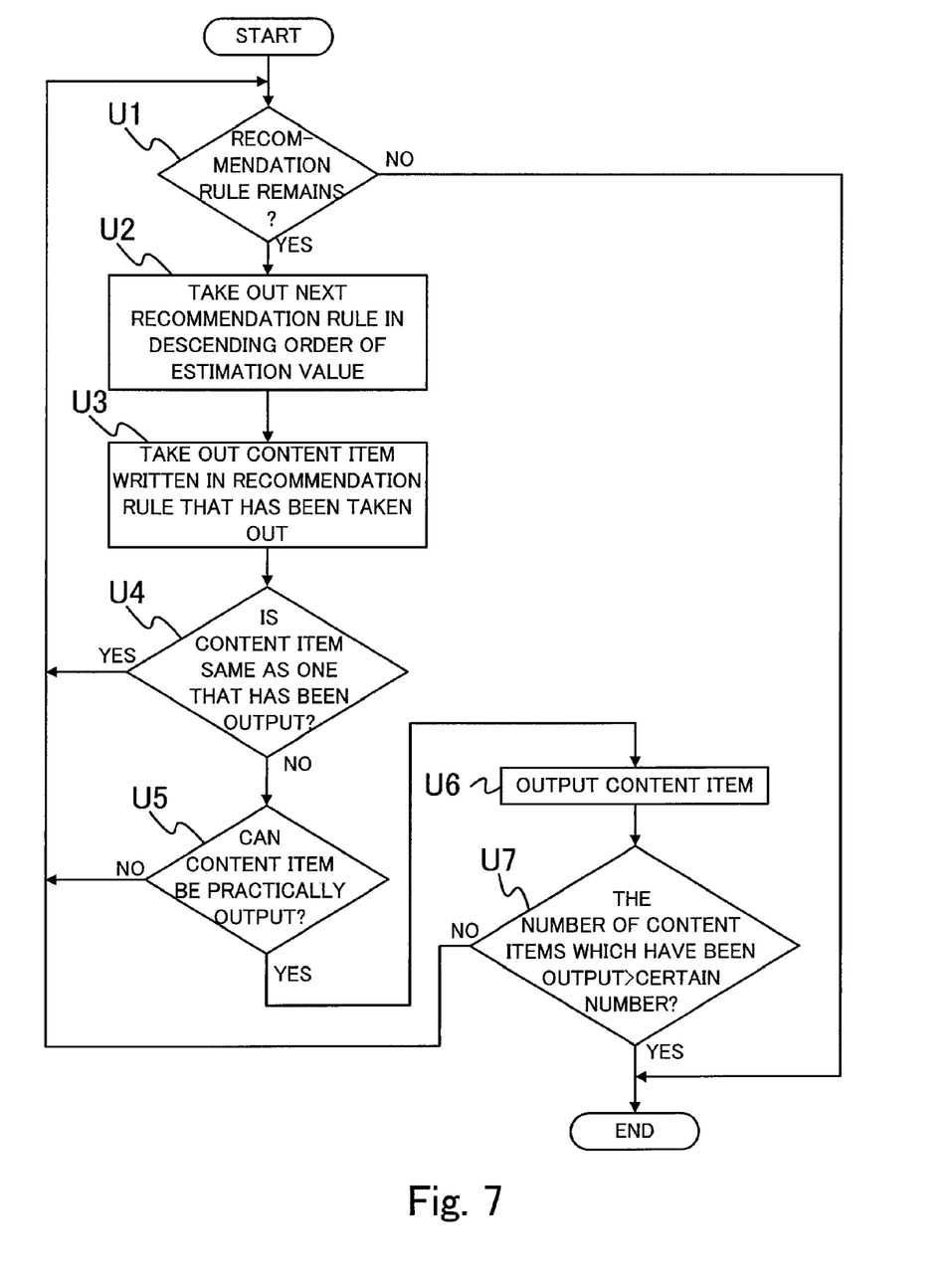
FIG. 7 shows an example of flowchart of a process for selecting a shortcut button.

A process for selecting an output content item by means of the selection section 205 will be explained below with reference to FIG. 7. FIG. 7 shows a flowchart of the process for selecting an output content item by means of the selection section 205.

To begin with, the selection section 205 determines whether the recommendation rules 211 to be processed exist (step U1). Upon branching off from step U1 to "NO", the selection section 205 ends the process.

Meanwhile, upon branching off from the (step U1) to "YES", the selection section 205 reads the recommendation rule 211 of the highest estimation value 213 in the recommendation rules 211 to be processed (step U2).

Then, the selection section 205 reads the content item (R3) written in the recommendation rule 211 that has been read at step U2 (step U3).

The selection section 205 determines whether the content item (R3) that has been read at step U3 and a content item that has been output after the process of the flowchart begins are the same content item (step U4). Upon branching off from step U4 to "YES", the process returns to step U1.

Upon branching off from step U4 to "NO", the selection section 205 determines whether the content item is a content item that can be practically output (step U5). If, e.g., the "switching button to a manner mode" content item is a content item to be processed and the mobile communication terminal 10 has already been set to a manner mode, a process for outputting the content item does not make sense. In such a case, the selection section 205 determines that it is a meaningless content item. In this way, upon branching off from step U5 to "NO", the process returns to step U1.

Meanwhile, upon branching off from step U5 to "YES", the selection section 205 provides the display section 10A with the shortcut button 10a regarding the recommendable content item and the short-cut button 10a is displayed on the display section 10A (step U6).

Then, the selection section 205 determines whether the number of the content items that have been selected exceeds a certain number (step U7). Upon branching off from step U7 to "YES", end the process. On the other hand, upon branching off from step U7 to "NO", the process returns to step U1.

According to the embodiment, as described above, the mobile communication terminal 10 recommends a plurality of content items in accordance with a condition of the mobile communication terminal 10 not exceeding the predetermined maximum number of the content items, and further prefers to recommend content items corresponding to a recommendation rule that more firmly accords with the condition.

Concretely, e.g., the estimator 204 combines a degree of an agreement between the condition estimation data 210 and the condition (R2) and the accuracy (C3), and treats the combination as an accuracy concerning a condition agreement. Thus, it is enabled to select a content item corresponding to the recommendation rule 211 with a higher degree of the agreement.

Further, in order to recommend the content item in accordance with a condition, it is preferable to recommend a content item that more properly accords with a present condition. According to the embodiment, as the estimator 204 estimates a degree of an agreement between the present condition of the mobile communication terminal 10 and the condition in the recommendation rule 211 and recommends a content item on the basis of the estimation, such a recommendation can be implemented. Further, as a priority is set, a priority order among a plurality of recommendation rules is clear.

Moreover, it is enabled to prefer to recommend a content item based on a specifically written rule by reducing priority of a recommendation rule of less specific conditions. That is, specificity of the condition can be quantitatively estimated. Concretely, the specificity of the condition is estimated on the basis of the number of "OR relations".

Concretely, e.g., even in a case where the condition estimation data 210 accords with a plurality of the conditions (R2) of the recommendation rules 211 of ID(R1)=1 and ID(R2)=2 at the same time, such as a case where the condition estimation data 210 indicated "morning, standstill" in the recommendation rule 211 shown in FIG. 4, the priority order of the recommendation rule 211 is determined on the basis of the specificity of the condition (the recommendation rule for which the condition is more specifically written is given priority). That is, a content item more suitable for a condition of the mobile communication terminal 10 can be recommended to a user.

The present invention has been described above on the basis of the embodiment. The present invention is not limited to the embodiment described above, and it is a matter of course that the embodiment can be variously modified and applied within a scope of the present invention.

Further, the embodiment described above includes inventions of various phases, and a plurality of the disclosed portions can be combined so that various inventions can be extracted. In a case, e.g., where the problems to be solved by the invention can be solved and the effect of the invention can be obtained even if some of the whole portions of the embodiment is removed, the configuration without the removed portions can be extracted as an invention.

What is claimed is:

1. A mobile communication terminal, comprising:
a storage device which stores rule information including a plurality of pairs of condition information and content information for selecting a program to be recommended, wherein the condition information is composed of a plurality of condition labels;

a condition estimator which generates condition estimation data including accuracy data indicating a degree of agreement between a condition indicated by a corresponding one of the plurality of condition labels and a condition of the mobile communication terminal for the corresponding condition label based on sensed data, wherein each of the plurality of condition labels is fallen into one of a plurality of condition items;

a priority decision section which estimates the rule information and determines priority data for each pair of the condition information and the content information;

an estimator which generates an estimation value indicating a sum of the accuracy data from the condition estimator and the priority data from the priority decision section; and a selection section which provides a shortcut button to run the program with a display device based on the estimation value and the rule information.

2. The mobile communication terminal according to claim 1, wherein the sensed data includes at least one of time information, place information, and movement information.

3. The mobile communication terminal according to claim 2, wherein the time information is output from a clock device, the place information is generated by a GPS receiver, and the movement information is generated by an accelerometer.

4. The mobile communication terminal according to claim 1, wherein the selection section selects the shortcut buttons in descending order of the highest estimation value.

5. The mobile communication terminal according to claim 1, wherein the selection section displays a number of shortcut buttons on the display device.

6. The mobile communication terminal according to claim 1, wherein the rule information further includes a basic priority value, and the priority decision section calculates the priority data based on the number of condition labels from the condition item set to the rule information and the basic priority value.

7. A mobile communication terminal, comprising:
an input section which obtains data provided from a sensor which senses a physical quantity;

a condition estimator which generates condition estimation data including accuracy data indicating a degree of agreement between a condition indicated by a corresponding one of a plurality of condition labels and a condition of the mobile communication terminal for the corresponding condition label based on the data obtained by the input section, wherein each of the plurality of condition labels is fallen into one of a plurality of condition items;

a recommend rule database on which a plurality of recommend rules each associating a condition indicated by one of the plurality of condition labels and a content piece according to content written as the condition is recorded;

a recommend rule estimator which estimates the recommend rules recorded on the recommend rule database to generate priority data of each of the individual recommend rules;

an estimated value operation section which computes an estimated value for one of a sum of the accuracy data and the priority data of the recommend rule; and a selection section which selects a content piece to be recommended based on the estimated value and provides a shortcut button regarding the selected content item with a display device.

8. The mobile communication terminal according to claim 7, wherein the recommend rule estimator estimates the recommend rule on the basis of specificity of content written as the condition of the recommend rule, the recommend rule estimator performing a process for reducing the priority of the recommend rule of low specificity.

9. The mobile communication terminal according to claim 8, wherein the recommend rule estimator computes the number of ORs included in the condition of the recommend rule for each of the condition items, the recommend rule estimator converting a computed result to the number of unused condition items.

10. The mobile communication terminal according to claim 7, wherein the sensor is one of a GPS receiver, an accelerometer and a clock device.

11. A method for recommending a user a content item by means of a mobile communication terminal, comprising:
storing rule information including a plurality of pairs of condition information and content information for selecting a program to be recommended, wherein the condition information is composed of a plurality of condition labels;

generating condition estimation data including accuracy data indicating a degree of agreement between a condition indicated by a corresponding one of the plurality of condition labels and a condition of the mobile communication terminal for the corresponding condition label based on sensed data, wherein each of the plurality of condition labels is fallen into one of a plurality of condition items;

estimating the rule information to determine priority data for each pair of the condition information and the content information;

generating an estimation value indicating a sum of the accuracy data and the priority data; and providing a shortcut button to run the program with a display device based on the estimation value and the rule information.

12. The method for recommending a user a content item according to claim 11, wherein the sensed data includes at least one of time information, place information, and movement information.

13. The method for recommending a user a content item according to claim 12, wherein the time information is output from a clock device, the place information is generated by a GPS receiver, and the movement information is generated by an accelerometer.

14. The method for recommending a user a content item according to claim 11, wherein a number of shortcut buttons are selected in descending order of the highest estimation value.

15. The method for recommending a user a content item according to claim 11, further comprising displaying a number of shortcut buttons, on the display device.

16. The method for recommending a user a content item according to claim 11, wherein the rule information further includes a basic priority value, and the priority data is calculated based on the number of condition labels from the condition item set to the rule information and the basic priority value.

* * * * *